US007220804B1

(12) United States Patent
Kao

(10) Patent No.: US 7,220,804 B1
(45) Date of Patent: May 22, 2007

(54) METHOD FOR PREPARING A CATALYST SYSTEM AND ITS USE IN A POLYMERIZATION PROCESS

(75) Inventor: Sun-Chueh Kao, Belle Mead, NJ (US)

(73) Assignee: Univation Technologies, LLC, Houston, TX (US)

( * ) Notice: Subject to any disclaimer, the term of this patent is extended or adjusted under 35 U.S.C. 154(b) by 857 days.

(21) Appl. No.: 09/687,734

(22) Filed: Oct. 13, 2000

(51) Int. Cl.
  *C08F 4/44* (2006.01)
(52) U.S. Cl. .............. 526/89; 526/128; 526/129; 526/160; 526/154; 526/943; 526/902
(58) Field of Classification Search ............ 526/89, 526/160, 161, 171, 129, 905, 901, 128, 943, 526/902, 154, 142; 502/104, 152, 74, 125, 502/155
See application file for complete search history.

(56) References Cited

U.S. PATENT DOCUMENTS

| | | | |
|---|---|---|---|
| 4,701,432 A | 10/1987 | Welborn, Jr. | 502/113 |
| 4,808,561 A | 2/1989 | Welborn, Jr. | 502/104 |
| 4,871,705 A | 10/1989 | Hoel | 502/117 |
| 4,897,455 A | 1/1990 | Welborn, Jr. | 526/129 |
| 4,912,075 A | 3/1990 | Chang | 502/107 |
| 4,914,253 A | 4/1990 | Chang | 585/523 |
| 4,935,397 A | 6/1990 | Chang | 502/117 |
| 4,937,217 A | 6/1990 | Chang | 502/111 |
| 4,937,301 A | 6/1990 | Chang | 526/128 |
| 5,008,228 A | 4/1991 | Chang | 502/111 |
| 5,015,749 A | 5/1991 | Schmidt et al. | 556/179 |
| 5,057,475 A | 10/1991 | Canich et al. | 502/104 |
| 5,086,025 A | 2/1992 | Chang | 502/117 |
| 5,147,949 A | 9/1992 | Chang | 526/129 |
| 5,212,232 A | 5/1993 | Kuramoto et al. | 524/779 |
| 5,229,478 A | 7/1993 | Floyd et al. | 526/160 |
| 5,238,892 A | 8/1993 | Chang | 502/111 |
| 5,240,894 A | 8/1993 | Burkhardt et al. | 502/108 |
| 5,332,706 A | 7/1994 | Nowlin et al. | 502/107 |
| 5,420,220 A | 5/1995 | Cheruvu et al. | 526/348.1 |
| 5,427,991 A | 6/1995 | Turner | 502/103 |
| 5,446,001 A | 8/1995 | Gurtzgen | 502/151 |
| 5,468,702 A | 11/1995 | Jejelowo | 502/104 |
| 5,473,028 A | 12/1995 | Nowlin et al. | 526/114 |
| 5,492,975 A | 2/1996 | Peifer et al. | 525/274 |
| 5,534,474 A | 7/1996 | Becker et al. | 502/152 |
| 5,602,067 A | 2/1997 | Nowlin et al. | 502/104 |
| 5,643,847 A | 7/1997 | Walzer, Jr. | 502/117 |
| 5,728,855 A | 3/1998 | Smith et al. | 556/179 |
| 5,731,451 A | 3/1998 | Smith et al. | 556/173 |
| 5,756,416 A | 5/1998 | Wasserman et al. | 502/114 |
| 5,777,143 A | 7/1998 | Malpass et al. | 556/179 |
| 5,831,109 A | 11/1998 | Smith et al. | 556/179 |
| 5,856,255 A | 1/1999 | Krzystowczyk et al. | 502/150 |
| 5,902,766 A | 5/1999 | Butler et al. | 502/152 |
| 5,910,463 A | 6/1999 | Ernst et al. | 502/107 |
| 5,968,864 A | 10/1999 | Shamshoum et al. | 502/104 |
| 6,028,151 A | 2/2000 | Wasserman et al. | 526/129 |
| 6,180,735 B1 * | 1/2001 | Wenzel | 526/142 |
| 6,852,659 B1 * | 2/2005 | Kao et al. | 502/104 |

FOREIGN PATENT DOCUMENTS

| | | |
|---|---|---|
| EP | 0308177 B1 | 7/1992 |
| EP | 0 546 690 A1 | 6/1993 |
| EP | 0170059 B2 | 10/1995 |
| EP | 0747430 A1 | 12/1996 |
| EP | 0662979 B1 | 7/1997 |
| EP | 0819706 A1 | 1/1998 |
| EP | 0953581 A1 | 11/1999 |
| EP | 0969019 A1 | 1/2000 |
| WO | WO 94/26793 | 11/1994 |
| WO | WO 96/13531 | 5/1996 |
| WO | WO 96/16092 | 5/1996 |
| WO | WO 97/06186 | 2/1997 |
| WO | WO 97/15602 | 5/1997 |
| WO | WO 98/02246 | 1/1998 |
| WO | WO 99/03580 | 1/1999 |

OTHER PUBLICATIONS

W. Kaminsky, et al., "Polymerization of Styrene with Supported Half-Sandwich Complexes," *Journal of Polymer Science: Part A: Polymer Chemistry*, vol. 37, pp. 2959-2968 (1999).
Xu, et al., Characterization of Isotactic Polypropylene Prepared with Dimethylsilyl bis(1-indenyl)zirconium dichloride Supported on Methylaluminoxane Pretreated Silica, *European Polymer Journal*, vol. 35, pp. 1289-1294 (1999).
O'Brien, et al, "EXAFS Analysis of a Chiral Alkene Polymerisation Catalyst Incorporated in the Mesoporous Silicate MCM-41," *Chem. Commun.*, pp. 1905-1906 (1997);.
Bonini, et al., "Propylene Polymerization Through Supported Metallocene/MAO Catalysts: Kinetic Analysis and Modelling," *Journal of Polymer Science: Part A: Polymer Chemistry*, vol. 33, pp. 2393-2404 (1995).

* cited by examiner

Primary Examiner—Robert D. Harlan
(74) *Attorney, Agent, or Firm*—Kevin M. Faulkner; Leandro Arechederra

(57) ABSTRACT

The present invention relates to a supported catalyst composition and a method for making the supported catalyst composition and its use in a process for polymerizing olefin(s). In particular, the invention is directed to a method for making a supported catalyst composition by contacting a supported activator with a bulky ligand and a metal compound.

13 Claims, No Drawings

METHOD FOR PREPARING A CATALYST SYSTEM AND ITS USE IN A POLYMERIZATION PROCESS

FIELD OF THE INVENTION

The present invention relates to a method for preparing a catalyst system and for its use in a process for polymerizing olefin(s). In particular, the invention is directed to a method for preparing a catalyst composition of a supported activator and a metal compound and a bulky ligand.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has greatly expanded. Also, advances in polymerization technology have provided more efficient, highly productive and economically enhanced processes. Especially illustrative of these advances is the development of technology utilizing bulky ligand metallocene catalyst systems. In particular, in a slurry or gas phase process where typically a supported catalyst system is used, there are a variety of different methods described in the art for supporting bulky ligand metallocene catalyst systems.

Illustrative methods for producing supported bulky ligand metallocene catalyst systems include: U.S. Pat. Nos. 5,332,706 and 5,473,028 have resorted to a particular technique for forming a catalyst by incipient impregnation; U.S. Pat. Nos. 5,427,991 and 5,643,847 describe the chemical bonding of non-coordinating anionic activators to supports; U.S. Pat. No. 5,492,975 discusses polymer bound metallocene catalyst systems; PCT publication WO 97/06186 published Feb. 20, 1997 teaches removing inorganic and organic impurities after formation of the metallocene catalyst itself; PCT publication WO 97/15602 published May 1, 1997 discusses readily supportable metal complexes; U.S. Pat. No. 4,937,217 generally describes a mixture of trimethylaluminum and triethylaluminum added to an undehydrated silica then adding a metallocene catalyst; EP-B1-0 308 177 generally describes adding a wet monomer to a reactor containing a metallocene, trialkylaluminum and undehydrated silica; U.S. Pat. Nos. 4,912,075, 4,935,397 and 4,937,301 generally relate to adding trimethylaluminum to an undehydrated silica and then adding a metallocene to form a dry supported catalyst; U.S. Pat. No. 4,914,253 describes adding trimethylaluminum to undehydrated silica, adding a metallocene and then drying the catalyst with an amount of hydrogen to produce a polyethylene wax; U.S. Pat. Nos. 5,008,228, 5,086,025 and 5,147,949 generally describe forming a dry supported catalyst by the addition of trimethylaluminum to a water impregnated silica to form alumoxane in situ and then adding the metallocene; U.S. Pat. Nos. 4,808,561, 4,897,455 and 4,701,432 describe techniques to form a supported catalyst where the inert carrier, typically silica, is calcined and contacted with a metallocene(s) and a activator/cocatalyst component; U.S. Pat. No. 5,238,892 describes forming a dry supported catalyst by mixing a metallocene with an alkyl aluminum then adding undehydrated silica; and U.S. Pat. No. 5,240,894 generally pertains to forming a supported metallocene/alumoxane catalyst system by forming a metallocene/alumoxane reaction solution, adding a porous carrier, and evaporating the resulting slurry to remove residual solvent from the carrier.

There are a variety of techniques discussed for preparing a supported activator and to its use in a catalyst system for polymerizing olefin(s). The following non-limiting examples of patent publications discussing supported activators, which are all fully incorporated herein by reference, include: U.S. Pat. No. 5,728,855 directed to the forming a supported oligomeric alkylaluminoxane formed by treating a trialkylaluminum with carbon dioxide prior to hydrolysis; U.S. Pat. Nos. 5,831,109 and 5,777,143 discusses a supported methylalumoxane made using a non-hydrolytic process; U.S. Pat. No. 5,731,451 relates to a process for making a supported alumoxane by oxygenation with a trialkylsiloxy moiety; U.S. Pat. No. 5,856,255 discusses forming a supported auxiliary catalyst (alumoxane or organoboron compound) at elevated temperatures and pressures; U.S. Pat. No. 5,739,368 discusses a process of heat treating alumoxane and placing it on a support; EP-A-0 545 152 relates to adding a metallocene to a supported alumoxane and adding more methylalumoxane; U.S. Pat. Nos. 5,756,416 and 6,028,151 discuss a catalyst composition of a alumoxane impregnated support and a metallocene and a bulky aluminum alkyl and methylalumoxane; EP-B1-0 662 979 discusses the use of a metallocene with a catalyst support of silica reacted with alumoxane; PCT WO 96/16092 relates to a heated support treated with alumoxane and washing to remove unfixed alumoxane; U.S. Pat. Nos. 4,912,075, 4,937,301, 5,008,228, 5,086,025, 5,147,949, 4,871,705, 5,229,478, 4,935,397, 4,937,217 and 5,057,475, and PCT WO 94/26793 all directed to adding a metallocene to a supported activator; U.S. Pat. No. 5,902,766 relates to a supported activator having a specified distribution of alumoxane on the silica particles; U.S. Pat. No. 5,468,702 relates to aging a supported activator and adding a metallocene; U.S. Pat. No. 5,968,864 discusses treating a solid with alumoxane and introducing a metallocene; EP 0 747 430 A1 relates to a process using a metallocene on a supported methylalumoxane and trimethylaluminum; EP 0 969 019 A1 discusses the use of a metallocene and a supported activator; EP-B2-0 170 059 relates to a polymerization process using a metallocene and a organo-aluminum compound, which is formed by reacting aluminum trialkyl with a water containing support; U.S. Pat. No. 5,212,232 discusses the use of a supported alumoxane and a metallocene for producing styrene based polymers; U.S. Pat. No. 5,026,797 discusses a polymerization process using a solid component of a zirconium compound and a water-insoluble porous inorganic oxide preliminarily treated with alumoxane; U.S. Pat. No. 5,910,463 relates to a process for preparing a catalyst support by combining a dehydrated support material, an alumoxane and a polyfunctional organic crosslinker; U.S. Pat. Nos. 5,332,706, 5,473,028, 5,602,067 and 5,420,220 discusses a process for making a supported activator where the volume of alumoxane solution is less than the pore volume of the support material; WO 98/02246 discusses silica treated with a solution containing a source of aluminum and a metallocene; WO 99/03580 relates to the use of a supported alumoxane and a metallocene; EP-A1-0 953 581 discloses a heterogeneous catalytic system of a supported alumoxane and a metallocene; U.S. Pat. No. 5,015,749 discusses a process for preparing a polyhydrocarbylalumoxane using a porous organic or inorganic imbiber material; U.S. Pat. Nos. 5,446,001 and 5,534,474 relates to a process for preparing one or more alkylaluminoxanes immobilized on a solid, particulate inert support; and EP-A1-0 819 706 relates to a process for preparing a solid silica treated with alumoxane.

Also, the following articles, also fully incorporated herein by reference for purposes of disclosing useful supported activators and methods for their preparation, include: W. Kaminsky, et al., "Polymerization of Styrene with Supported Half-Sandwich Complexes", Journal of Polymer Science Vol. 37, 2959–2968 (1999) describes a process of adsorbing a methylalumoxane to a support followed by the adsorption of a metallocene; Junting Xu, et al. "Characterization of isotactic polypropylene prepared with dimethylsilyl bis(1-indenyl)zirconium dichloride supported on methylaluminoxane pretreated silica", European Polymer Journal 35 (1999) 1289–1294, discusses the use of silica treated with methylalumoxane and a metallocene; Stephen O'Brien, et al., "EXAFS analysis of a chiral alkene polymerization catalyst incorporated in the mesoporous silicate MCM-41" Chem. Commun. 1905–1906 (1997) discloses an immobilized alumoxane on a modified mesoporous silica; and F. Bonini, et al., "Propylene Polymerization through Supported Metallocene/MAO Catalysts: Kinetic Analysis and Modeling" Journal of Polymer Science, Vol. 33 2393–2402 (1995) discusses using a methylalumoxane supported silica with a metallocene.

While all these methods have been described in the art, a need for an improved method for preparing supported bulky ligand metallocene catalysts has been discovered.

SUMMARY OF THE INVENTION

This invention provides a method of making a new and improved supported bulky ligand metallocene catalyst system and for its use in a polymerizing process.

In one embodiment, the invention relates to a method for making a supported catalyst system comprising the steps of: (a) forming a supported activator; (b) introducing a bulky ligand; and introducing a metal compound. In another aspect, the invention is directed to a method for making a supported catalyst system comprising the steps of: (a) combining a support material with an activator; (b) adding a bulky ligand; and (c) adding a metal compound. In this embodiment it is preferred to complete step (a) to form a supported activator prior to steps (b) and (c).

In another embodiment, the invention is directed to a process for polymerizing olefin(s), particularly in a gas phase or slurry phase process, utilizing the supported catalyst systems prepared by the above described methods.

In one embodiment, the invention is directed to a process for polymerizing olefin(s) in the presence of a catalyst system, the catalyst system comprising the combination of a supported activator, a bulky ligand, and a metal compound. In this embodiment, it is preferred that the supported activator is combined with the bulky ligand and the metal compound prior to their introduction to a polymerization reactor.

In yet another embodiment, the invention is to a process for polymerizing olefin(s) in a reactor in the presence of a catalyst system comprising an activator, a support material, a bulky ligand and a metal compound. Preferably in this embodiment, the activator and the support material are first combined to form a supported activator.

DETAILED DESCRIPTION OF THE INVENTION

Introduction

The invention is directed toward a method for making and using a supported catalyst system. It has been suprisingly discovered that contacting a supported activator with a bulky ligand and a metal compound results in an active polymerization catalyst. While not wishing to be bound to any particular theory it is believed that in the presence of the supported activator the bulky ligand and the metal compound, complex, or "self-assemble", into an active olefin polymerization catalyst. However, for purposes of this patent specification and appended claims, a bulky ligand and metal compound are separate components and are not the equivalent to a preformed bulky ligand metallocene-type compound. The method of the invention provides a simple route to producing a supported catalyst system without the need to synthesize, for example, a bulky ligand metallocene catalyst compound. Furthermore, the invention provides for the flexibility for easily changing the bulky ligand without the need for synthesizing another bulky ligand metallocene type catalyst compound. This capability has many advantages including mixed catalyst technologies, especially where two or more bulky ligand metallocene-type catalysts are utilized.

Bulky Ligands

The bulky ligands of the invention are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cycloalkadiene or other similar functioning precursors capable of forming a bulky ligand such as a cyclopentadienyl ligand or cyclopentadienyl-type ligand structure or other specific similar functioning ligand structure such as a pentadiene, cyclopentadiene, indene, pentamethylcyclopentadiene, fluorine, fulvenes, a cyclooctatetraendiyl or an imide ligand. The metal atom is preferably selected from Groups 3 through 15 and the lanthanide or actinide series of the Periodic Table of Elements.

The bulky ligands are open, acyclic or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenan-threneyl ligands, indenyl ligands, benzindenyl ligands, fluorenyl ligands, octahydro-fluorenyl ligands, cyclooctatetraendiyl ligands, cyclopentacyclododecene ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands.

In one embodiment, the bulky ligands are any ligand structure capable of $\eta$-bonding, preferably $\eta^3$-bonding and most preferably $\eta^5$-bonding, preferably to the metal of the metal compounds discussed below.

In yet another embodiment, the atomic molecular weight (MW) of the bulky ligands exceeds 60 a.m.u., preferably greater than 65 a.m.u.

In another embodiment, the bulky ligands may comprise one or more heteroatoms, for example nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other bulky ligands include but are not limited to bulky amides, phosphides, alkoxides, aryloxides, imides, carbolides, borollides, porphyrins, phthalocyanines, corrins and other polyazomacrocycles.

In one embodiment, two or more bulky ligands are utilized. In this embodiment, the bulky ligands may be the same or different.

Each bulky ligand may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl) silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

In another embodiment, two or more bulky ligands may be bridged to each other through a bridging groups. Non-limiting examples of bridging groups include bridging groups containing at least one Group 13 to 16 atom, often referred to as a divalent moiety such as but not limited to at least one of a carbon, oxygen, nitrogen, silicon, boron, germanium and tin atom or a combination thereof. Preferably bridging groups contain a carbon, silicon or germanium atom, most preferably at least one silicon atom or at least one carbon atom. The bridging group may also contain substituent groups R as defined above including halogens. Non-limiting examples of bridging groups may be represented by $R'_2C$, $R'_2Si$, $R'_2Si\ R'_2Si$, $R'_2Ge$, $R'P$, where $R'$ is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen.

Metal Compounds

The metal compounds of the invention are preferably transition metal compounds where the metal is selected from Groups 4 through 12, preferably Groups 4, 5 and 6, more preferably the transition metal is from Group 4, most preferably titanium, zirconium or hafnium. In another embodiment, the metal compound of the invention is a transition metal compound where the metal is selected from the group consisting of zirconium, titanium, hafnium, chromium and vanadium.

Other ligands may be bonded to the metal, for example, a monoanionic ligand that is sigma-bonded to the metal. Non-limiting examples of ligands that are bonded or complexed to the metal include weak bases such as amines, phosphines, ethers, carboxylates, dienes, hydrocarbyl radicals having from 1 to 50 carbon atoms, hydrides or halogens and the like or a combination thereof. In another embodiment, two or more of these ligands bonded to the metal form a part of a fused ring or ring system. Other examples of ligands bonded to the metal include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methyl-anilide), dimethylamide, dimethylphosphide radicals and the like.

Other bulky ligands and metal compounds are described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158 and 5,900,517 and PCT publications WO 93/08221, WO 93/08199, WO 95/07140, WO 98/11144, WO 98/41530, WO 98/41529, WO 98/46650, WO 99/02540, WO 99/14221, WO 00/35973 and WO 00/35928 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

Also bulky ligands and metal compounds are further discussed in PCT publication WO 92/00333, WO 94/07928, WO 91/04257, WO 94/03506, WO96/00244, WO 97/15602, WO 96/33202, WO 96/34021, WO 97/17379, WO 98/22486, WO 99/20637 and WO 00/11006 (metalloid salt catalyst) and U.S. Pat. Nos. 5,057,475, 5,096,867, 5,055,438, 5,198,401, 5,227,440, 5,637,660, 5,539,124, 5,554,775, 5,756,611, 5,233,049, 5,744,417, 5,856,258, 5,264,405, 6,066,704, 6,069,237 (open pentadienyl ligand), U.S. Pat. No. 6,072,067 (bulky ligand substituted with a heteroatom), U.S. Pat. Nos. 6,087,515 and 6,090,739 and European publication EP-A-0 420 436 and EP-A1-0 874 005, all of which are herein fully incorporated by reference.

In another embodiment, the bulky ligands include those bidentate ligands containing pyridine or quinoline moieties, such as those described in U.S. application Ser. No. 09/103, 620 filed Jun. 23, 1998, or those bulky ligands described in PCT publications WO 99/01481 and WO 98/42664, which are fully incorporated herein by reference.

It is within the scope of this invention, in one embodiment, that the bulky ligands and metal compounds include those complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference.

Also included as bulky ligands are those diimine based ligands of Group 8 to 10 metal compounds disclosed in PCT publications WO 96/23010, WO 97/48735 and WO 98/40374 and Gibson, et. al., Chem. Comm., pp. 849–850 (1998), all of which are herein incorporated by reference.

Other bulky ligands and metal compounds are described in EP-A2-0 816 384 and U.S. Pat. No. 5,851,945, which is incorporated herein by reference. In addition, the bulky ligands include bridged bis(arylamido) ligands described by D. H. McConville, et al., in Organometallics 1195, 14, 5478–5480, which is herein incorporated by reference and bis(hydroxy aromatic nitrogen ligands) described in U.S. Pat. No. 5,852,146, which is incorporated herein by reference.

In one embodiment, the metal compounds of the invention are represented by the formula: $ML_x$ where M is metal from Group 3 to 12 of the Periodic Table of Elements, preferably from Group 4 to 10, more preferably from Group 4 to 6, and most preferably from Group 4, especially zirconium, titanium or hafnium; L is the same or different and is selected from the group consisting of hydrogen, halogen, hydrocarbyl, alkoxide, aryoxide, carboxylate, carbodionate, amide, carbamate, phosphide and the like; and "x" is an integer depending on the valence state of metal, preferably such that the metal compound is a neutral compound, where "x" is equal to the valence state of the metal.

Non-limiting preferred metal compounds include: $ZrCl_4$, $ZrBr_4$, $ZrI_4$, $Zr(CH_2C_6H_5)_4$, $Zr[CH_2C(CH_3)_2C_6H_5]_4$, $Zr[CH_2Si(CH_3)_3]_4$, $Zr(acetylacetonate)_4$, $Zr(2,2,6,6$-tetramethyl-3,5-heptanedionate$)_4$, $Zr(F)_3(acetylacetonate)$, $Zr(ethoxide)_4$, $Zr(t$-butoxide$)_4$, $Zr(phenoxide)_4$, $Zr(NMe2)_4$, (Me is methyl), $Zr(NEt_2)_4$, (Et is ethyl) $Zr(diethylcarbamate)_4$, $Zr(dimethylcarbamate)_4$, $Zr(pivalate)_4$, $Zr(benzoate)_4$.

Activators

For the purposes of this patent specification and appended claims, the term "activator" is defined to be any compound or component or method which can activate any of the bulky ligand(s) and metal compound combinations of the invention for the polymerization of olefin(s).

Non-limiting activators, for example include a Lewis acid or a non-coordinating ionic activator or ionizing activator or any other compound including Lewis bases, aluminum alkyls, conventional-type cocatalysts and combinations thereof. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166 and 5,856,256 and European publications EP-A-0 561 476, EP-B1-0 279 586, EP-A-0 594-218 and EP-B1-0 586 665, and PCT publication WO 94/10180, all of which are herein fully incorporated by reference. Other alumoxanes include siloxy alumoxanes as described in EP-B1-0 621 279 and U.S. Pat. No. 6,060,418, and chemically functionalized carboxylate-alumoxane described in WO 00/09578, which are herein incorporated by reference.

Organoaluminum compounds as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299, 5,502,124 and 6,087,460 and U.S. patent application Ser. No. 08/285,380, filed Aug. 3, 1994, all of which are herein fully incorporated by reference.

Other activators include those described in PCT publication WO 98/07515 such as tris (2,2', 2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating metal compounds with perchlorates, periodates and iodates including their hydrates. WO 98/30602 and WO 98/30603 incorporated by reference describe the use of lithium (2,2'-bisphenyl-ditrimethylsilicate).4THF as an activator. EP-A2-0 103 675 describes fluorinated organic compound activators, which is herein incorporated by reference. WO 99/18135 incorporated herein by reference describes the use of organo-boron-aluminum activators. EP-B1-0 781 299 describes using a silylium salt in combination with a non-coordinating compatible anion. Other activators are described in for example, U.S. Pat. Nos. 5,849,852, 5,859, 653, 5,869,723 and 6,030,917 (gallium based anion activators) and PCT WO 98/32775, WO 00/09513 (three coordinate aluminum activator) and WO 00/20115, which are herein incorporated by reference.

Supports Materials

Any of the conventional support materials are useful in this invention. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred support materials include silica, alumina, silica-alumina, magnesium chloride, and mixtures thereof. Other useful support materials include magnesia, titania, zirconia, montmorillonite (EP-B1 0 511 665), hydrotalcites, and the like. Also, combinations of these support materials may be used, for example, silica-chromium, silica-alumina, silica-titania and the like.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 µm. More preferably, the surface area of the support material is in the range of from about 50 to about 500 m²/g, pore volume of from about 0.5 to about 3.5 cc/g and average particle size of from about 10 to about 200 µm. Most preferably the surface area of the support material is in the range is from about 100 to about 400 m²/g, pore volume from about 0.8 to about 3.0 cc/g and average particle size is from about 5 to about 100 µm. The average pore size of the carrier of the invention typically has pore size in the range of from 10 to 1000 Å, preferably 50 to about 500 Å, and most preferably 75 to about 350 Å.

The support materials may be treated chemically, for example with a fluoride compound as described in WO 00/12565, which is herein incorporated by reference.

Supported Activators

The above-described activators may be combined with one or more support materials also described above using one or more support methods well known in the art. For example, in a most preferred embodiment, an activator is deposited on, contacted with, or incorporated within, vaporized onto, reacted with, adsorbed or absorbed in, or on, a support material.

Other supported activators are described in for example WO 00/13792 that refers to supported boron containing solid acid complex.

In a preferred method of forming the supported activator the amount of liquid in which the activator is present is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

In an embodiment, the supported activator is in a dried state, a solid. In another embodiment, the supported activator is in a substantially dry state or a slurry, preferably in a mineral oil slurry.

In another embodiment, two or more separately supported activators are used, or alternatively, two or more different activators on a single support are used, in combination with a bulky ligand and a metal compound.

Supported Catalyst System

The supported catalyst system of the invention generally involves the combining, contacting, vaporizing, blending, bonding and/or mixing any of the above described supported activators, bulky ligands and metal compounds in any order.

In one embodiment of the method of the invention the supported activator is combined with the bulky ligand prior to the addition of the metal compound. In another embodiment, the bulky ligand and the metal compound are contacted first, and then combined with the supported activator. In an alternate embodiment, an activator is combined with the bulky ligand and/or metal compound to form a mixture, and then the mixture is added to the support material.

In one embodiment, the supported activator is contacted with two or more bulky ligands with one or more metal compounds. In one embodiment, the two bulky ligands are the same and one type of metal compound is used. In another embodiment, two different bulky ligands, in type or having different substituents are used in combination with one metal compound, or two different metal compounds.

In another embodiment the combined amount in weight percent of the supported activator to the bulky ligand and metal compound are in the range of from 99.9 weight percent to 50 weight percent, preferably from about 99.8 weight percent to about 60 weight percent, more preferably from about 99.7 weight percent to about 70 weight percent, and most preferably from about 99.6 weight percent to about 80 weight percent.

In yet another embodiment, the mole ratio of the metal compound to the bulky ligand is in the range of from 0.01 to 100, preferably from 0.02 to 50, more preferably 0.05 to 20, most preferably 0.1 to 10.

In yet another embodiment the mole ratio of the metal of the activator to the metal of the metal compound is in the range of from 5000 to 1, preferably from about 2000 to 2, more preferably from about 1000 to about 5, and most preferably from about 500 to about 10.

Where the activator contains aluminum, preferably an alumoxane, the mole ratio of the metal of the activator component to the metal of the metal compound are in the range of between 0.3:1 to 1000:1, preferably 20:1 to 800:1, and most preferably 50:1 to 500:1.

Where the activator is an ionizing activator such as those based on the anion tetrakis(pentafluorophenyl)boron, the mole ratio of the metal of the activator component to the metal component of the bulky ligand metallocene catalyst is preferably in the range of between 0.3:1 to 3:1.

In other embodiments of the invention the supported activator is in a dry or substantially dried state, or in a solution, when contacted with the bulky ligand and the metal compound. The resulting supported catalyst system is used in a dry or substantially dry state, or as a slurry, in preferably a mineral oil. Also, the dried supported catalyst system of the invention can be reslurried in a liquid such as mineral oil, toluene, or any the hydrocarbon prior to its introduction into a polymerization reactor.

Furthermore, it is contemplated that the supported activator, bulky ligand, and metal compound can be used in the same solvents or different solvents. For example, the bulky ligands can be in toluene, the metal compound in isopentane and the supported activator in mineral oil, or any combination of solvents.

Preferably the contact temperature for combining the supported activator, bulky ligand and metal compound is in the range of from 0° C. to about 100° C., more preferably from 15° C. to about 75° C., most preferably at about ambient temperature and pressure.

Preferably, the supported activator is contacted with the bulky ligand an the metal compound for a period of time greater than a second, preferably from about 1 minute to about 48 hours, more preferably from about 10 minutes to about 10 hours, and most preferably from about 30 minutes to about 6 hours. The period of contacting refers to the mixing time only.

Antistatic agents or surface modifiers may be used in combination with the supported activator, bulky ligand and metal compound of the invention, see for example those agents and modifiers described in PCT publication WO 96/11960, which is herein fully incorporated by reference. Also, a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998 may be used in combination with a supported activator, a bulky ligand and a metal compound.

In one embodiment of the invention, olefin(s), preferably $C_2$ to $C_{30}$ olefin(s) or alpha-olefin(s), preferably ethylene or propylene or combinations thereof are prepolymerized in the presence of the supported activator, bulky ligand and metal compound combination prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921, 825, 5,283,278 and 5,705,578 and European Publication EP-B1-0 279 863 and PCT Publication WO 97/44371, and all of which are herein fully incorporated by reference.

Polymerization Process

The supported catalyst system or composition of the invention described above are suitable for use in any polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligands and metal compounds as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B1-0 649 992, EP-A-0 802 202 and EP-B-0 634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference A preferred process of the invention is where the process, preferably a slurry or gas phase process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

Polymer Products

The polymers produced by the process of the invention can be used in a wide variety of products and end-use applications. The polymers produced by the process of the invention include linear low-density polyethylene, elastomers, plastomers, high-density polyethylenes, low-density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a bulky ligand metallocene catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Activity values are normalized values based upon grams of polymer produced per mmol of transition metal in the catalyst per hour per 100 psi (690 kPa) of ethylene polymerization pressure. MI is Melt Index, and was reported as grams per 10 minutes per ASTM D-1238, Condition E. FI is Flow Index, and was measured 10 times the weight used in the melt index above per ASTM D-1238, Condition F. MFR is Melt Flow Ratio, and is the ratio of FI:MI.

MAO is methylalumoxane in toluene (30 wt %), available from Albemarle Corporation, Baton Rogue, La.

Kaydol, a white mineral oil, was purchased from Witco Corporation, Memphis, Tenn., and was purified by first degassed with nitrogen for 1 hour, followed by heating at 80° C. under vacuum for 10 hours.

Tetrabenzylzirconium ($Zr(CH_2C_6H_5)_4$) and bis(indenyl) zirconium dichloride were purchased from Boulder Scientific Company.

Indene and pentamethylcyclopentadiene were purchase from Aldrich Chemical Company.

Example 1

Preparation of Supported MAO (SMAO)

A toluene solution of methylalumoxane (MAO) was prepared by mixing 960 g of 30 wt % MAO, (MAO was purchased from Albemarle Corporation, Baton Rogue, La.), in 2.7 liter of dry, degassed toluene. This solution was stirred at ambient temperature while 850 g of silica gel (Davison 955, dehydrated at 600° C. available from W. R. Grace, Davison Division, Baltimore, Md.) was added. The resulting slurry was stirred at ambient temperature for 1 hour and the solvent was removed under reduced pressure with a stream of nitrogen at 85° C. The drying is continued until the material temperature has been constant for 2 hours. The resulting free-flowing white powder has an aluminum loading of 4.1 mmol Al per gram of solid.

Example 2

Preparation of Supported Tetrabenzylzirconium (TBZ) (Composition A)

Inside the dry-box, a 60 ml bottle equipped with a magnetic stir bar were charged with 0.050 g of tetrabenzylzirconium (0.110 mmol) and 19.1 g of dried, degassed Kaydol oil. The resulting yellow slurry was stirred at ambient temperature for 2 hours, followed by addition of 3.43 g of the above-mentioned SMAO of Example 1. This mixture was then stirred at ambient temperature for 12 hours before being used for polymerization.

Example 3

Preparation of Supported Indene (IN) and Tetrabenzylzirconium (TBZ) Mixture of this Invention (Composition B)

Inside the dry-box, a 60 ml bottle equipped with a magnetic stir bar were charged with 0.100 g of tetrabenzylzirconium (0.220 mmol), 0.110 g of indene (0.948 mmol), and 38.0 g of dried, degassed Kaydol oil. The resulting light orange mixture was stirred at ambient temperature for 2 hours, followed by addition of 6.70 g of the above-mentioned SMAO of Example 1. The resulting slurry was then stirred at ambient temperature for 12 hours before being used for polymerization.

Example 4

Treatment of Supported TBZ with Indene of this Invention (Composition C)

Inside the dry-box, a silica supported TBZ in Kaydol oil of Example 2 was stirred at ambient temperature while 0.043 g (0.371 mmol) of neat indene was added. The resulting orange slurry was stirred at ambient temperature for 12 hours before being used for polymerization.

Example 5

Preparation of Supported Pentamethylcyclopentadiene (Cp*) and Tetrabenzylzirconium (TBZ) Mixture of this Invention (Composition D)

Inside the dry-box, a 60 ml bottle equipped with a magnetic stir bar were charged with 0.049 g of tetrabenzylzirconium (0.108 mmol), 0.061 g of pentamethylcyclopenta-diene (0.449 mmol) and 18.1 g of dried, degassed Kaydol oil. This mixture was stirred at ambient temperature for 2 hours, followed by addition of 3.19 g of the above mentioned SMAO of Example 1. The resulting orange slurry was then stirred at ambient temperature for 12 hours before being used for polymerization.

Example 6

Preparation of Silica Supported Pentamethylcyclopentadiene (Cp*) and Tetrabenzylzirconium (TBZ) Mixture of this Invention (Composition E)

Same procedure as Example 5 was followed, except 0.028 g of pentamethylcyclopenta-diene (0.206 mmol) was used.

Comparative Example 7

Preparation of Silica Supported Bis(indenyl)zirconium Dichloride (INZ)

Inside the dry-box, a 60 ml bottle equipped with a magnetic stir bar were charged with 0.046 g of INZ and 20.42 g of dried, degassed Kaydol oil. The resulting red slurry was stirred at ambient temperature for 2 hours, followed by addition of 3.0 g of the above mentioned SMAO of Example 1. This mixture was then stirred at ambient temperature for 12 hours before being used for polymerization.

Example 8

Preparation of Bis(Pentamethylcyclopentadienyl)Zirconium Dipivalate

To a solution of bis(pentamethylcyclopentadienyl)zirconium dichloride (0.865 g, 2.001 mmol) and pivalic acid (0.685 g, 6.710 mmol) in toluene (30 ml) at 40° C. was added triethylamine (0.726 g, 7.174 mmol) with stirring. A white precipitate formed immediately which was removed by filtration. The title compound was isolated as an off-white powder in 90% by evaporating the solvent and excess pivalic acid under vacuum at 65° C. The title compound such prepared exhibited purity above 98% based on NMR results. $^1$H NMR (toluene $d_8$) δ1.83 (s, 30H), 1.30 (s, 18H).

Comparative Example 9

Preparation of Supported Bis(Pentamethylcyclopentadienyl) Zirconium Dipivalate

Inside the dry-box, a 60 ml bottle equipped with a magnetic stir bar were charged with 0.062 g of bis(pentamethylcyclopentadienyl)zirconium dipivalate (0.110 mmol) and 15.0 g of dried, degassed Kaydol oil. This mixture was stirred at ambient temperature for 2 hours, followed by addition of 2.890 g of the above mentioned SMAO of Example 1. The resulting slurry was then stirred at ambient temperature for 12 hours before being used for polymerization.

Polymerization Process

Examples 10 through 16

In each of Examples 10 through 16, polyethylene was produced in a slurry phase reactor using the catalyst composition specified in Table 1 below.

For each of Examples 10 through 16, a Kaydol oil slurry of one of the catalyst compositions of the invention or comparative examples was prepared. An aliquot of this slurry mixture was added to a 8 ounce (250 ml) bottle containing 100 ml of hexane. Hexene-1 (20 ml) was then added to the pre-mixed catalyst composition. Anhydrous conditions were maintained. The polymerization time for Examples 10 through 6 was 30 minutes.

The slurry reactor was a 1 liter, stainless steel autoclave equipped with a mechanical agitator. The reactor was first dried by heating at 96° C. under a stream of dry nitrogen for 40 minutes. After cooling the reactor to 50° C., 500 ml of hexane was added to the reactor, followed by 0.25 ml of tri-isobutylaluminum (TIBA) in hexane (0.86 mole, used as impurity scavenger), and the reactor components were stirred under a gentle flow of nitrogen. The pre-mixed catalyst composition was then transferred to the reactor under a stream of nitrogen and the reactor was sealed. The temperature of the reactor was gradually raised to 75° C. and the reactor was pressured to 150 psi (1034 kPa) with ethylene. Heating was continued until a polymerization temperature of 85° C. was attained. Unless otherwise noted, polymerization was continued for 30 minutes, during which time ethylene was continually added to the reactor to maintain a constant pressure. At the end of 30 minutes, the reactor was vented and opened.

Table 1 gives the activity, the MI, FI, and MFR of Example 10 through 16. As shown in Table 1, the catalyst compositions of the invention (Examples 11, 12, 13, and 14) exhibited similar activity to that of the comparative examples.

Examples 15 and 15

TABLE 1

| Example | Composition used | Zr loading (mmol) | Activity | MI | FI | MFR |
|---|---|---|---|---|---|---|
| 10 | A | 0.001 | 5714 | | | |
| 11 | B | 0.001 | 91726 | 1.4 | 25.5 | 19 |
| 12 | C | 0.001 | 66496 | 1.2 | 22 | 18 |
| 13 | D | 0.001 | 14586 | | 0.9 | |
| 14 | E | 0.001 | 9624 | | 1.4 | |
| 15 | Comparative Example 7 | 0.001 | 74211 | 1 | 20 | 20 |
| 16 | Comparative Example 9 | 0.001 | 14977 | | 2 | |

While the present invention has been described and illustrated by reference to particular embodiments, those of ordinary skill in the art will appreciate that the invention lends itself to variations not necessarily illustrated herein. For example, it is contemplated that the supported activator, bulky ligand and metal compound may used with one or more bulky ligand metallocene catalysts, or traditional Ziegler-Natta or Phillips-type catalyst. For this reason, then, reference should be made solely to the appended claims for purposes of determining the true scope of the present invention.

I claim:

1. A method for preparing a supported catalyst composition the method comprising the steps of:
   (a) contacting an activator with a porous support material to form a supported activator, said activator comprising one of an alumoxane, a modified alumoxane, a neutral ionizing activator or an ionic ionizing activator; and
   (b) contacting the supported activator and a mineral oil with a combination comprising a ligand selected from the group consisting of cyclopentadienyl ligands, indenyl ligands, benzindenyl ligands, fluorenyl ligands, octahydro-fluorenyl ligands, cyclopentacyclododecene ligands, pentalene ligands and hydrogenated versions thereof and a metal compound;
   wherein the metal compound is represented by the formula:

$ML_x$ wherein M is a Group 4 metal from the Periodic Table of Elements and L is selected from the group consisting of hydrogen, halogen, hydrocarbyl, alkoxide, aryoxide, carboxylate, carbodionate, amide, carbamate and phosphide; and "x" is an integer depending on the valence state of metal wherein the ligand and the metal compound are contacted with the supported activator as separate components to form the supported catalyst composition.

2. The method of claim 1 wherein the ligand and the metal compound are combined in a liquid prior to contacting with the supported activator.

3. The method of claim 2 wherein the activator is an alumoxane.

4. The method of claim 2 wherein the liquid is an aliphatic hydrocarbon.

5. A process for polymerizing olefin(s) in the presence of a supported catalyst system, the supported catalyst system produced by a process comprising: contacting a supported activator, a ligand a metal compound and a mineral oil; wherein the supported activator is formed by contacting an activator with a porous support material to form a supported activator, said activator comprising one of an alumoxane, a modified alumoxane, a neutral ionizing activator or an ionic ionizing activator, wherein the ligand is selected from the group consisting of cyclopentadienyl ligands, indenyl ligands, benzindenyl ligands, fluorenyl ligands, octahydrofluorenyl ligands, cyclopentacyclododecene ligands, pentalene ligands and hydrogenated versions thereof, with the provision that the ligand the metal compound are separate and are not the equivalent of a performed ligand metallocene-type compound, wherein the metal compound is represented by the formula:

wherein M is a group 4 metal from the Periodic Table of Elements and L is selected from the group consisting of hydrogen, halogen, hydrocarbyl, alkoxide, aryloxide, carboxylate, carbodionate, amide, and carbamate; and "x" is an integer depending on the valence state of metal; and polymerizing said olefins in the presence of said supported catalyst.

6. The process of claim 5, wherein the process is a gas phase process.

7. The process of claim 5, wherein the supported catalyst system is in a slurry state.

8. An activated olefin polymerization supported catalyst system comprising a ligand, a metal compound and a supported activator, combined in a mineral oil with the provision that the ligand and the metal compound are separate and are not the equivalent of a preformed ligand metallocene-type compound; wherein the ligand is selected from the group consisting of cyclopentadienyl ligands, indenyl ligands, benzindenyl ligands, fluorenyl ligands, octahydro-fluorenyl ligands, cyclopentacyclododecene ligands, pentalene ligands and hydrogenated versions thereof, wherein the metal compound is represented by the formula:

wherein M is a group 4 metal from the Periodic Table of Elements and L is selected from the group consisting of hydrogen, halogen, hydrocarbyl, alkoxide, aryloxide, carboxylate, carbodionate, amide, and carbamate; and "x" is an integer depending on the valence state of metal and wherein the supported activator is formed by contacting an activator with a porous support material to form a supported activator, said activator comprising one of an alumoxane, a modified alumoxane, a neutral ionizing activator or an ionic ionizing activator.

9. The supported catalyst systems of claim 8, wherein the activated supported alumoxane.

10. The supported catalyst system of claim 8, wherein the activated support polymerization catalyst system is in a liquid.

11. The method of claim 5, wherein the process comprises two or more ligands, wherein said two or more ligands may be the same or different.

12. The method of claim 1, wherein the method comprises two or more ligands, wherein said ligands may be the same or different.

13. The activated olefin polymerization supported catalyst system of claim 8, wherein the activated olefin polymerization supported catalyst system comprises two or more ligands, wherein said ligands may be the same or different.

* * * * *